United States Patent
Hauger et al.

(10) Patent No.: US 6,419,360 B1
(45) Date of Patent: Jul. 16, 2002

(54) SCANNER

(75) Inventors: Christian Hauger, Aalen; Werner Pöltinger, Oberkochen; Wilhelm Ulrich, Aalen-Dewangen, all of (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/886,172

(22) Filed: Jun. 20, 2001

(30) Foreign Application Priority Data

Jul. 1, 2000 (DE) .......................................... 100 32 067

(51) Int. Cl.$^7$ ................................................ A61B 3/14
(52) U.S. Cl. ........................................ 351/206; 356/497
(58) Field of Search ................................ 351/206, 207, 351/214, 216, 221; 356/493, 479, 485, 492, 497; 600/407, 310; 606/12, 13

(56) References Cited

U.S. PATENT DOCUMENTS 5,537,162 A    7/1996  Hellmuth et al.
5,795,295 A  * 8/1998  Hellmuth et al. ............ 600/407
5,847,827 A  * 12/1998 Fercher ....................... 356/493

FOREIGN PATENT DOCUMENTS

EP    0 581 871 B1   12/1998   ............ G01B/9/02

* cited by examiner

*Primary Examiner*—George Manuel

(57) ABSTRACT

A scanner for optical coherence tomography for linear scanning of an object with electromagnetic radiation, in which the scanning direction runs transversely of the direction of propagation of the electromagnetic radiation, includes a deflecting element rotatable around a rotation axis that deflects the electromagnetic radiation, incident along a direction of incidence, toward the object and, by its rotation, effects the linear scanning of the object. A beam forming optics is arranged on the object side of the rotatable deflecting element and concentrates electromagnetic radiation coming from the deflecting element. The rotation axis of the rotary deflecting element is parallel to the direction of incidence of the electromagnetic radiation.

7 Claims, 1 Drawing Sheet

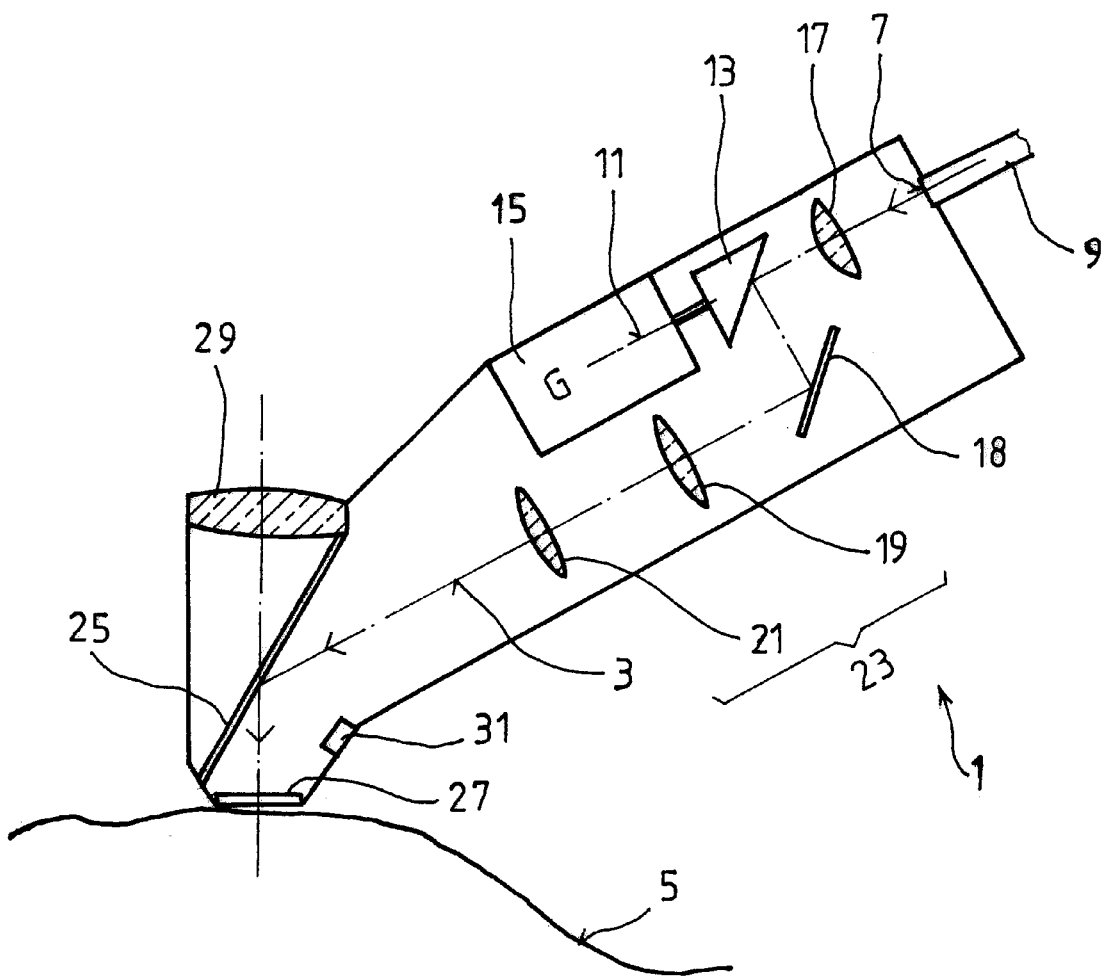

SCANNER

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a scanner for optical coherence tomography for linear scanning of an object with electromagnetic radiation.

A scanner of this kind is known from EP 0 581 871 B1, particularly from FIGS. 3B, 3C, 3D and 6, and from U.S. Pat. No. 5,537,162, particularly from FIG. 1.

SUMMARY OF THE INVENTION

The invention has as its object to further improve a scanner of the category concerned.

This object is attained by a deflecting element which is rotatable around a rotation axis and which deflects radiation coming from a radiation source toward the object of study and effects, by its rotation, a linear scanning of the object of study. A beam-forming optics is arranged between this deflecting element and the object of study, and concentrates the radiation coming from the deflecting element toward the object. The rotation axis of the rotatable deflecting element is parallel to the direction of incidence of the radiation. The scanner according to the invention is mechanically constructed in a simple manner and can be especially compact. Furthermore, expanded possibilities of use result from the invention. The scanner according to the invention can, for example, be compact enough to be constructed as a hand-held scanner, in particular.

In a particular embodiment, the beam-forming optics includes a telecentric scanning objective, so that the exact focusing state of the scanning beam has no effect on the position of the scan line in the object.

In a further embodiment, a collimator for the incident radiation is arranged on the side of the rotatable deflecting element remote from the object. The scanning radiation can thereby be optimized in relation to the beam forming optics. A beamsplitter is arranged on the object side of the telecentric scanning objective. In this manner, the scanned region of the object of study can be made visible to an operator. This is useful for the control or guiding of a scanner constructed as a hand-held device.

When the beamsplitter is dichroic, scanning radiation lying outside the visible wavelength region, e.g. in the infrared, can be efficiently concentrated onto the object, and at the same time the scan line can be optimally observed.

The observation conditions for an operator can be further optimized with a magnifying optics arranged on the side of the beamsplitter remote from the object. Particularly reliable monitoring of the scan line can be attained with an end window on the object side, marked with the scan line or scanning line.

BRIEF DESCRIPTION OF THE DRAWINGS

The invention is described in an embodiment example, using the accompanying FIGURE, in which the scanner 1 according to the invention, shown in a schematic sectional representation, is illustrated by way of example.

DETAILED DESCRIPTION OF INVENTION

Electromagnetic radiation is deflected in the scanner 1, along a beam path 3 onto an object 5 to be studied; an optical fiber 9 end surface 7, acting as a radiation source, is imaged on the object 5. This image of the radiation source is moved over the object 5 in a scan line which extends transversely of the plane of the FIGURE and thus transversely of the direction of propagation of the radiation.

For this purpose, a deflecting element 13 rotating around a rotation axis 11 deflects the beam path 3 in different directions depending on its rotational position, and thereby effects, in cooperation with the subsequent optical elements of the scanner 1 which are fixed to the scanner, the linear scanning of the object 5.

The rotation axis 11 is parallel to and collinear with the section of the beam path 3 situated between the end surface 7 and the deflecting element 13, that is, parallel to the direction of incidence of the radiation. The deflecting element 13 which deflects the beam path 3 through 90° has a planar deflecting surface oriented at 45° to the direction of incidence of the radiation, and is rotated around the rotation axis 11 by a rotary motor 15.

The radiation coming from the optical fiber 9 is collimated by a collimator lens element 17 before it is deflected by the rotatable deflecting element 13. After the rotatable deflecting element 13, the incident pencil of rays is deflected a further time by means of a deflecting element 18, fixed to the scanner and having a planar reflecting surface extending orthogonal to the plane of the Figure. The pencil of rays is thereafter concentrated toward the object 5 by a beam-forming optics 23 which is fixed to the scanner and consists of a telecentric scanning objective including the lenses 19 and 21. A beamsplitter 25 arranged between the beam forming optics 23 and the object 5 reflects the scanning radiation onto the object 5 through an end window 27 which has a marking of the scan line.

The beamsplitter 25 is reflective for the scanning radiation coming from the optical fiber 9 and is transparent in the visible wavelength region. The scanned region of the object 5 of study can thus be observed and monitored through a magnifying glass 29. A source 31 for visible electromagnetic radiation, arranged within the scanner 1, then provides particularly favorable observation conditions.

What is claimed is:

1. A scanner for optical coherence tomography for linear scanning of an object with electromagnetic radiation in a scanning direction running transversely of the direction of propagation of said electromagnetic radiation, comprising:

a deflecting element that is rotatable around a rotation axis and deflects said electromagnetic radiation, incident along a direction of incidence, toward said object and, by its rotation, effects linear scanning of said object, and beam forming optics arranged on the object side of said rotatable deflecting element that concentrates toward said object said electromagnetic radiation coming from said deflecting element, wherein said rotation axis of said rotatable deflecting element is parallel to said direction of incidence of said electromagnetic radiation.

2. The scanner according to claim 1, wherein said beam forming optics comprises a telecentric scanning objective.

3. The scanner according to claim 2, further comprising a beamsplitter arranged on the object side of said telecentric scanning objective.

4. The scanner according to claim 3, wherein said beamsplitter comprises a dichroic beamsplitter.

5. The scanner according to claim 3, further comprising a magnifying optics arranged on the side of said beamsplitter remote from said object.

6. The scanner according to claim 1, further comprising a collimator for incident radiation arranged on the side of said rotatable deflecting element remote from said object.

7. The scanner according to claim 6, further comprising an end window on said object side of said telecentric scanning objective, said end window having a marking of a scanning line.

* * * * *